United States Patent
Pant et al.

(10) Patent No.: US 10,277,114 B2
(45) Date of Patent: Apr. 30, 2019

(54) SINGLE STAGE ISOLATED POWER CONVERTER

(71) Applicant: BLACK & DECKER INC., New Britain, CT (US)

(72) Inventors: Pradeep M. Pant, Cockeysville, MD (US); Michael K. Forster, White Hall, MD (US)

(73) Assignee: Black & Decker Inc., New Britani, CT (US)

( * ) Notice: Subject to any disclaimer, the term of this patent is extended or adjusted under 35 U.S.C. 154(b) by 0 days.

(21) Appl. No.: 15/268,960

(22) Filed: Sep. 19, 2016

(65) Prior Publication Data

US 2018/0083529 A1    Mar. 22, 2018

(51) Int. Cl.
*B25F 5/02* (2006.01)
*H02M 1/00* (2006.01)
*H02M 1/42* (2007.01)
*B24B 23/02* (2006.01)
*H02P 23/26* (2016.01)
*H02P 27/08* (2006.01)
*H02P 29/50* (2016.01)

(52) U.S. Cl.
CPC .......... *H02M 1/4208* (2013.01); *B24B 23/02* (2013.01); *B25F 5/02* (2013.01); *H02M 1/4258* (2013.01); *H02P 23/26* (2016.02); *H02P 27/08* (2013.01); *H02M 2001/0025* (2013.01); *H02P 29/50* (2016.02); *Y02P 70/177* (2015.11)

(58) Field of Classification Search
CPC .......... H02P 29/50; H02P 23/26; H02P 27/08; B24B 23/02; B25F 5/02; H02M 1/4258; H02M 2001/0025; H02M 1/4208

USPC ........................................................ 418/400
See application file for complete search history.

(56) References Cited

U.S. PATENT DOCUMENTS

| | | | | |
|---|---|---|---|---|
| 5,081,570 A | * | 1/1992 | Chibani | H02M 1/4258 363/17 |
| 5,519,275 A | * | 5/1996 | Scott | F02B 63/04 310/112 |
| 5,719,754 A | | 2/1998 | Fraidlin et al. | |
| 5,847,942 A | * | 12/1998 | Bazinet | H02M 1/4258 363/25 |
| 6,296,065 B1 | * | 10/2001 | Carrier | B25F 5/02 173/171 |
| 6,850,426 B2 | * | 2/2005 | Kojori | H02P 23/0004 363/123 |
| 8,749,995 B2 | * | 6/2014 | Frattini | H03K 17/6872 363/21.02 |

(Continued)

FOREIGN PATENT DOCUMENTS

WO    2016100891    6/2016

OTHER PUBLICATIONS xtended EP Search Reported dated Oct. 4, 2017 issued in corresponding EP patent application No. 17179973.7.

*Primary Examiner* — Eduardo Colon Santana
*Assistant Examiner* — Devon A Joseph
(74) *Attorney, Agent, or Firm* — Amir Rohani

(57) ABSTRACT

Typically, power factor is improved by adding a full power factor correction (PFC) stage between the rectifier and the power converter. This disclosure applies line voltage modulation to the control feedback of an isolated full bridge converter, thereby combining the PFC stage with the isolated power stage and forming a single state isolated power converter.

16 Claims, 16 Drawing Sheets

(56) References Cited

U.S. PATENT DOCUMENTS

| | | | | |
|---|---|---|---|---|
| 8,879,286 B2* | 11/2014 | Lopez-Santillana | ........................ H02M 1/4225 | 363/68 |
| 9,406,915 B2* | 8/2016 | White | .................... H02J 7/0024 | |
| 2002/0044468 A1* | 4/2002 | Goodarzi | ................. H02M 1/10 | 363/98 |
| 2009/0121550 A1* | 5/2009 | Riviera | ................. H02J 7/0068 | 307/66 |
| 2010/0308782 A1* | 12/2010 | Werle | .................... H02M 3/157 | 323/282 |
| 2012/0104981 A1* | 5/2012 | Tseng | .................... H02M 3/158 | 318/400.3 |
| 2014/0001993 A1* | 1/2014 | Iwata | ...................... H02P 27/04 | 318/400.26 |
| 2014/0016370 A1* | 1/2014 | Chandrasekaran | ....... H01F 3/14 | 363/21.12 |
| 2014/0203755 A1* | 7/2014 | Becerra | ..................... H02P 6/10 | 318/812 |
| 2015/0229235 A1* | 8/2015 | Underhill | ............ H02M 1/4216 | 363/89 |

* cited by examiner

SINGLE STAGE ISOLATED POWER CONVERTER

FIELD

The present disclosure relates to single stage power converters for power tools having a brushless electric motor.

BACKGROUND

Handheld angle grinders are commonly used for cutting, grinding, sanding, and polishing workpieces. Due to the large diameter of the grinding disk and/or the large bias applied by the tool operator during certain tasks, the current demand by the tool from an AC power outlet can exceed the rating of the circuit breaker associated with the power outlet, thereby causing the breaker to trip. Consequently, there is a need to increase the power output of such grinders and other handheld power tools within the limits of the AC power source and without resorting to complicated and expensive power conversion circuits.

One known technique adds a capacitor to the DC bus, which lowers ripple voltage but at the same time lowers the power factor. To account for this power factor loss, it has been known to incorporate a two stage process wherein the power factor is corrected in a power factor correction circuit, which uses a feed forward signal and a feedback signal to adjust the power factor using current modulation techniques. Various techniques are set forth below for increasing power output by handheld power tools, especially ones employing a brushless electric motor, which do not require a second stage to account for power losses.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A single stage power converter is presented which may be implemented in a power tool. The power tool includes: a brushless electric motor; a rectifier circuit, a switching arrangement, a motor drive circuit and a control module. The rectifier circuit is configured to receive an incoming alternating current (AC) voltage signal and operates to convert the incoming AC voltage signal into a DC input signal. The switching arrangement has a plurality of motor switches interposed between the electric motor and the rectifier. A transformer may be electrically coupled between the switching arrangement and the electric motor. The motor drive circuit is interfaced with the motor switches and operates to control switching operation of the motor switches in accordance with the control signal received from the control module. The control module is configured to receive a feedback signal indicative of voltage applied to the electric motor and generates a control signal based on the feedback signal, where the control signal maintains a target setpoint voltage applied to the electric motor. Of note, the control module modulates the feedback signal with the incoming AC voltage signal.

In one embodiment, the components comprising the single stage power converter are implemented inside the power tool.

In another embodiment, the components comprising the single stage power converter are implemented inside an adapter that detachably couples to the power tool.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Example embodiments will now be described more fully with reference to the accompanying drawings.

Figure 1:
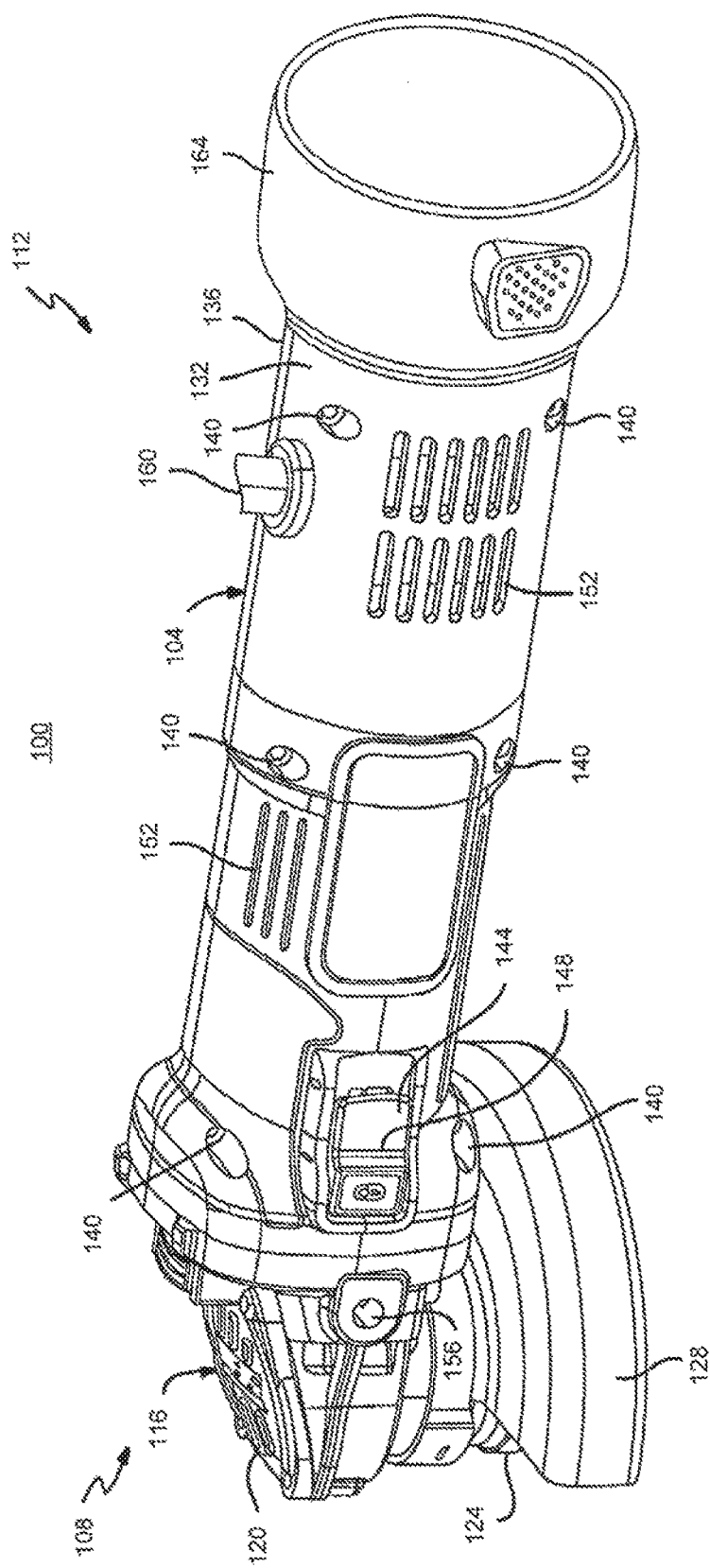
FIG. 1 is an example of a power tool.

FIG. 1 depicts an example of a power tool 100. In this example embodiment, the power tool 100 is a handheld grinder and is comprised of a housing 104 having an elongated shape. A user can grasp the power tool 100 by placing the palm of the user's hand over and around the housing 104. An output sub-assembly 116 is positioned at one end 108 of the housing 104 and comprises a right angle gear set 120 that drives a rotating disk 124. In this example embodiment, the rotating disk 124 comprises a grinder disk. The rotating disk 124 may be removed and replaced with a new rotating disk. For example, a user of the power tool 100 may replace the existing rotating disk 124 with a new rotating disk after the existing rotating disk 124 wears out. An adjustable guard 128 may cover at least a portion of the rotating disk 124 to obstruct sparks and debris generated during operation of the power tool 100.

While the present description is provided with reference to a grinder, it is readily understood that the broader aspects of the present disclosure are applicable to other types of power tools, including but not limited to sander, drill, impact driver, tapper, fastener driver, and saw. For example, the power tool 100 may include a chuck that is configured to receive a drill bit or a screw driver bit, thereby allowing the power tool 100 to be used as a power drill or a power screw driver. In another example embodiment, the grinder disk and/or output sub-assembly 116 may be removed and replaced with another output member that may be more suitable for a drill, a screw driver, or any other power tool, thus creating a multipurpose power tool.

The housing 104 has a first portion 132 and a second portion 136. The first portion 132 and second portion 136 may be secured together with screws 140, illustratively six, and enclose an electric motor or load and electronic circuit components, as further described below, that drive the output member 116. The first portion 132 further includes a power on/off switch 144 and a spindle lock 148. Putting the power on/off switch 144 in on and off positions turns on and off the electric motor (not shown), respectively. Pressing and holding the spindle lock 148 enables the user to change the rotating disk 124. A plurality of narrow slot openings 152 in the first 132 and second 136 portions allow for venting of the electric motor and the electronic circuit components. The one end 108 of the housing 104 also includes a threaded opening 156 for selectively attaching a side-handle (not shown) to enable two-handed operation.

A power cord 160 is connectable to an AC power socket and is positioned at an opposite end 112 of the housing 104. The power cord 160 provides power to the electric motor and the electronic circuit components of the power tool 100. Additionally or alternatively, the power tool 100 may be configured to receive a detachable adapter 164. Specifically, the housing 104 includes an adapter mounting portion to which the adapter 164 releasably couples thereto. The adapter 164 provides DC power to the electric motor and the other electronic components of the power tool. Different attachment mechanisms for the adapter are readily known in the art and may be employed in this application.

In some embodiments, it is envisioned that the tool may be configured to work with battery packs slidably connected in place of the adapter 164. The battery packs would have different nominal voltage ratings. For example, the tool may be configured to work with a single state low voltage pack (e.g., 20V) or a convertible low/medium voltage pack (e.g., 20V/40V or 20V/60V). In other examples, the tool may be configured to work with two convertible medium voltage packs to yield a high output voltage (e.g., 120V or 230V). It is understood that number and arrangement of battery cells in a pack as well as the cell chemistry may vary.

Figure 2:
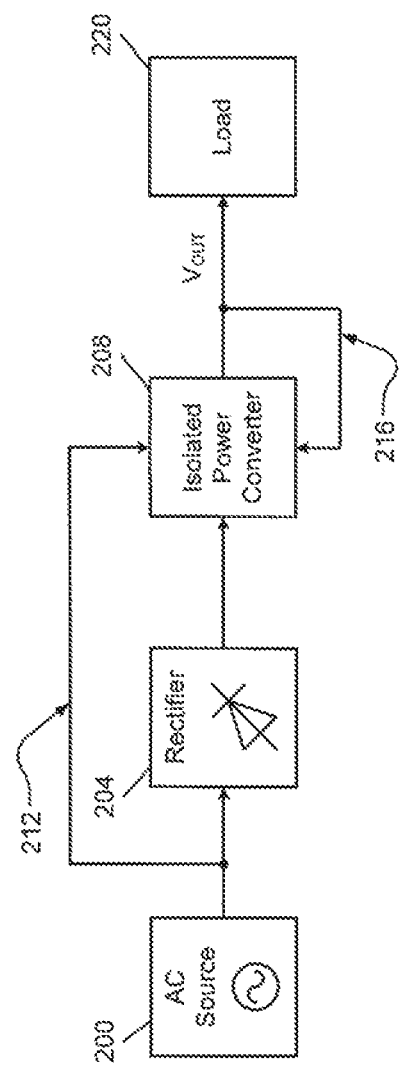
FIG. 2 is a block diagram that illustrates a single stage isolated power converter scheme that may be employed by the power tool.

FIG. 2 is a block diagram that illustrates a single stage isolated power converter scheme that may be employed by the power tool 100. The power converter scheme is comprised generally of an AC power supply 200, a rectifier 204, and an isolated power converter 208. The power converter scheme operates to convert an AC voltage signal from the AC power supply 200 to an output voltage $V_{OUT}$ using a single stage, isolated power converter 208. The output voltage in turn drives a load 220, such as the electric motor of the power tool. While reference is made to a power tool with an electric motor as a load, it is envisioned that the modulation scheme described here is applicable to other types of loads as well, including but not limited to a battery charger or LED lighting.

During operation, the isolated power converter 208 receives a feed forward signal 212 indicative of the AC line voltage. The isolated power converter 208 also receives a feedback signal 216 indicative of the output voltage ($V_{OUT}$). The isolated power converter 208 operates as a DC to DC converter with a line voltage modulated output. The feedback signal 216 (i.e., the output voltage ($V_{OUT}$)) is passed through a controller, and the output of the controller is modulated using the feed forward signal 212 (i.e., the AC line voltage signal) to force the voltage at the load 220 to follow AC voltage waveform. This voltage modulation acts as a power factor correction within the isolated power converter 208, using one stage to receive feed forward and feedback signals 212, 216 and to modify the voltage at the load 220.

Figure 3A:
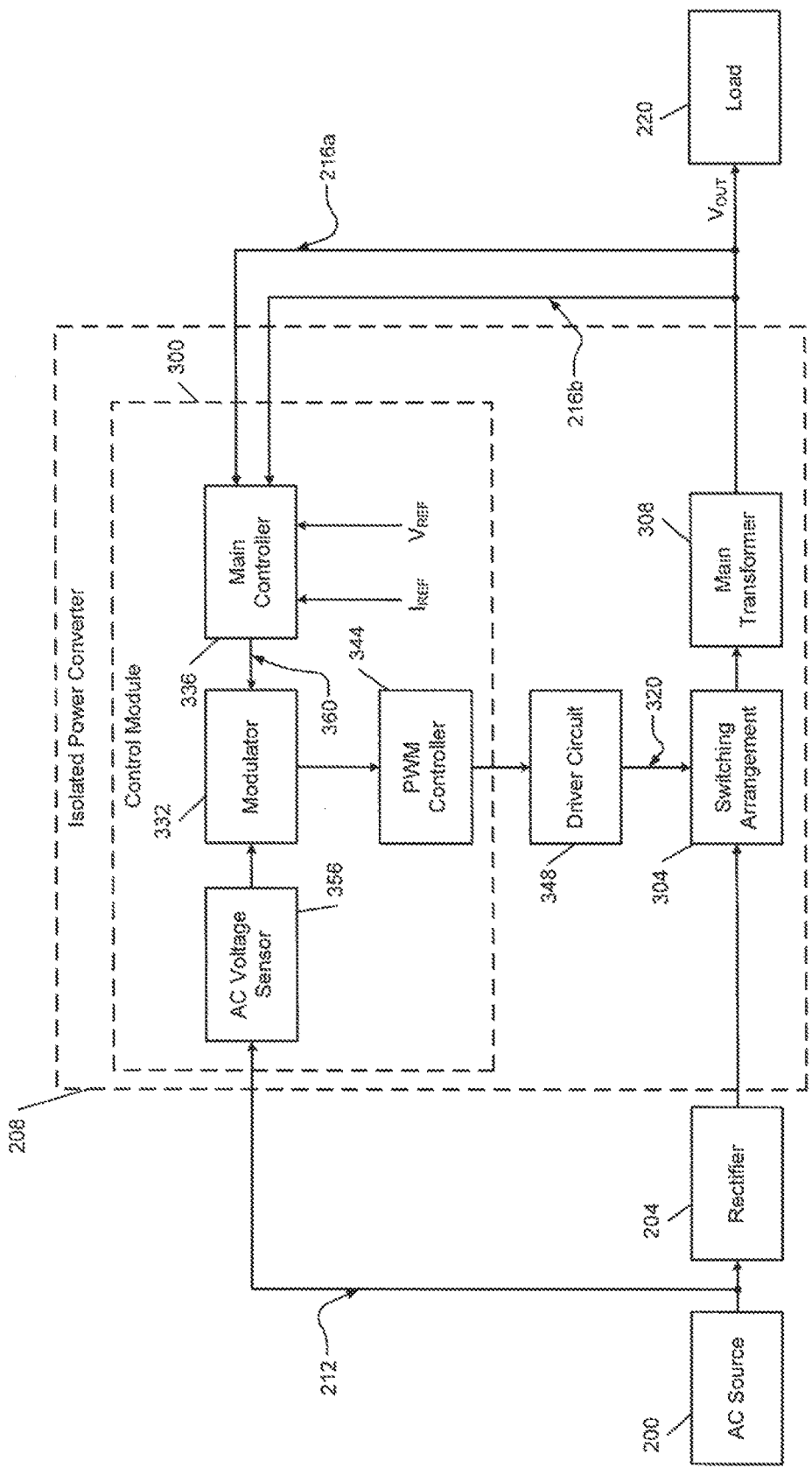
FIG. 3A is a block diagram that further illustrates the single stage isolated power converter scheme that may be employed by the power tool.

FIG. 3A is a block diagram further illustrating the single stage isolated power converter 208 which includes a control module 300. The control module 300 is configured to receive the feedback signal 216, which includes a voltage feedback signal 216a and a sensed current feedback signal 216b, and generate control signals that maintain a target setpoint voltage applied to the load 220. In one embodiment, the control signals are pulse width modulated (PWM) and the control module 300 operates to adjust the pulse widths to maintain the output voltage at the target setpoint voltage.

More specifically, the control module 300 receives an input AC line voltage 212, an output voltage feedback signal 216a, and a sensed current feedback signal 216b. The control module 300 in turn outputs switching control signals 320 to one or more switches in the switching arrangement 304. The switching arrangement 304 receives control signals from the control module 300 to toggle the switching devices between on and off states at predetermined frequencies, allowing the DC voltage from the rectifier 204 to pass through the switching arrangement 304 in an ordered manner and continue to the main transformer 308. In the example embodiment, the output voltage feedback signal 216a is received by the control module 300 through an optoisolator (shown in FIGS. 5A-E). The use of the optoisolator maintains the isolation between the isolated power converter 208 and the load 220.

The control module 300 is comprised generally of a main controller 336, a PWM controller 344, a modulator 332, and an AC voltage sensor 356. The main controller 336 within the control module 300 receives the voltage feedback signal 216a, the current feedback signal 216b, a current reference ($I_{REF}$), and a voltage reference or setpoint voltage ($V_{REF}$). Alternatively, the main controller 336 may generate the current and voltage reference signals or the PWM controller 344 could generate these reference signals. The main controller 336 produces a control signal 360, which represents a combination of the voltage and current feedback and the amount that those feedback values deviate from the reference values. The setpoint voltage ($V_{REF}$) and the current reference ($I_{REF}$) represent the desired voltage and current values, respectively.

The modulator 332 then modulates the control signal 360 with the AC line signal 212 which is produced by AC voltage sensor 356. The PWM controller 344 takes this modulated control signal and produces a PWM signal whose width is proportional to the main control signal. As previously noted, to maintain galvanic isolation, voltage control 324 may include an optoisolator to isolate the power converter 208 from the load 220.

The modulator 332 replaces the need for any power factor correction in this circuit, thereby providing for a single stage power converter. The modulator 332 does this by modulating the output of the main controller 336 with the AC line voltage 212 to produce a PWM control signal. The modulator 332 creates a power factor correction by having the PWM controller 344 control the modulation of the high frequency switches in the switching arrangement 304 to have the output voltage at the load 220 be proportional to the AC line voltage 212.

The PWM control signal (shown in FIGS. 3C and 5A-E as W) is intended to maintain the average output voltage ($V_{OUT}$) at a setpoint voltage, for example 60V, by feeding back the output voltage and modifying the control signal according to the AC line voltage as well. The PWM controller 344 sends signals to the driver circuit 348 to control the switching arrangement 304 as is required to produce the setpoint voltage ($V_{REF}$) at the load 220. The PWM controller 344 uses the PWM control signal (shown in FIGS. 3C and 5A-E as W) to adjust the width of the pulses based on the difference between the setpoint voltage/current and the feedback voltage 216a and feedback current 216b. For example, the more positive the PWM control signal, meaning the more the PWM control signal differs from the setpoint voltage, the pulse width would be made smaller. However, if the PWM control signal is negative, meaning the feedback voltage 216a and output voltage ($V_{OUT}$) is under 60V, the pulses would be adjusted to be wider.

Figure 3B:
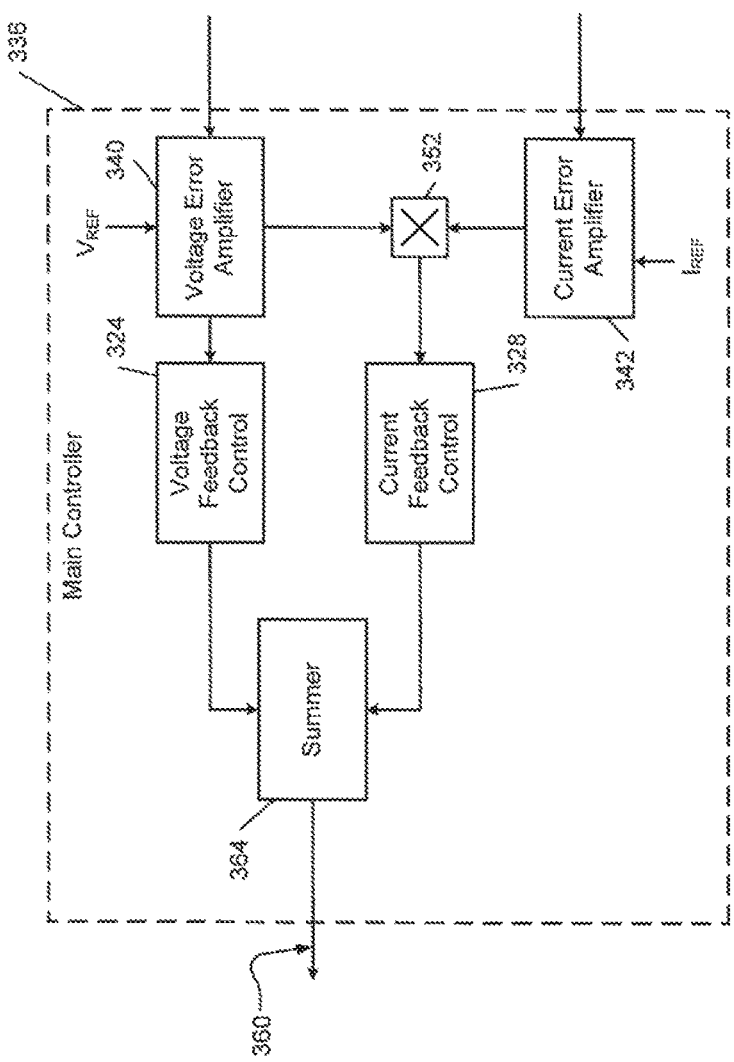
FIG. 3B is a block diagram that further illustrates an example implementation of the main controller of the single stage isolated power converter scheme that may be employed by the power tool.

FIG. 3B is a block diagram further illustrating an example implementation of the main controller 336 of the single stage isolated power converter 208. The main controller 336 is comprised generally of voltage feedback control 324, current feedback control 328, a voltage error amplifier 340, a current error amplifier 342, a multiplier 352, and a summer 364. The voltage error amplifier 340 produces a signal representative of the error between the output voltage ($V_{OUT}$) and the setpoint voltage ($V_{REF}$). The setpoint voltage is the desired output voltage. Voltage feedback control 324 produces an amplified error signal that is produced by the voltage error amplifier 340. The voltage feedback control 324 produces a proportional control, i.e., error signal multipled by a gain factor. The current error amplifier 342 also produces a current error signal. The current error signal is the difference between a desired current limit ($I_{REF}$) and current feedback signal 216b. If current feedback signal 216b is smaller than current reference $I_{REF}$, then the current feedback signal is zero. If current feedback signal 216b is greater than $I_{REF}$ signal, then the current feedback signal is positive. The multiplier 352 multiplies the current feedback signal by the voltage error signal. The current feedback control 342 also amplifies the multiplied value of the voltage feedback signal and the current feedback signal by a factor equal to desired gain. The summer 364 combines the signals produced by voltage feedback control 324 and current feedback control 328 to produce the control signal 360.

Figure 3C:
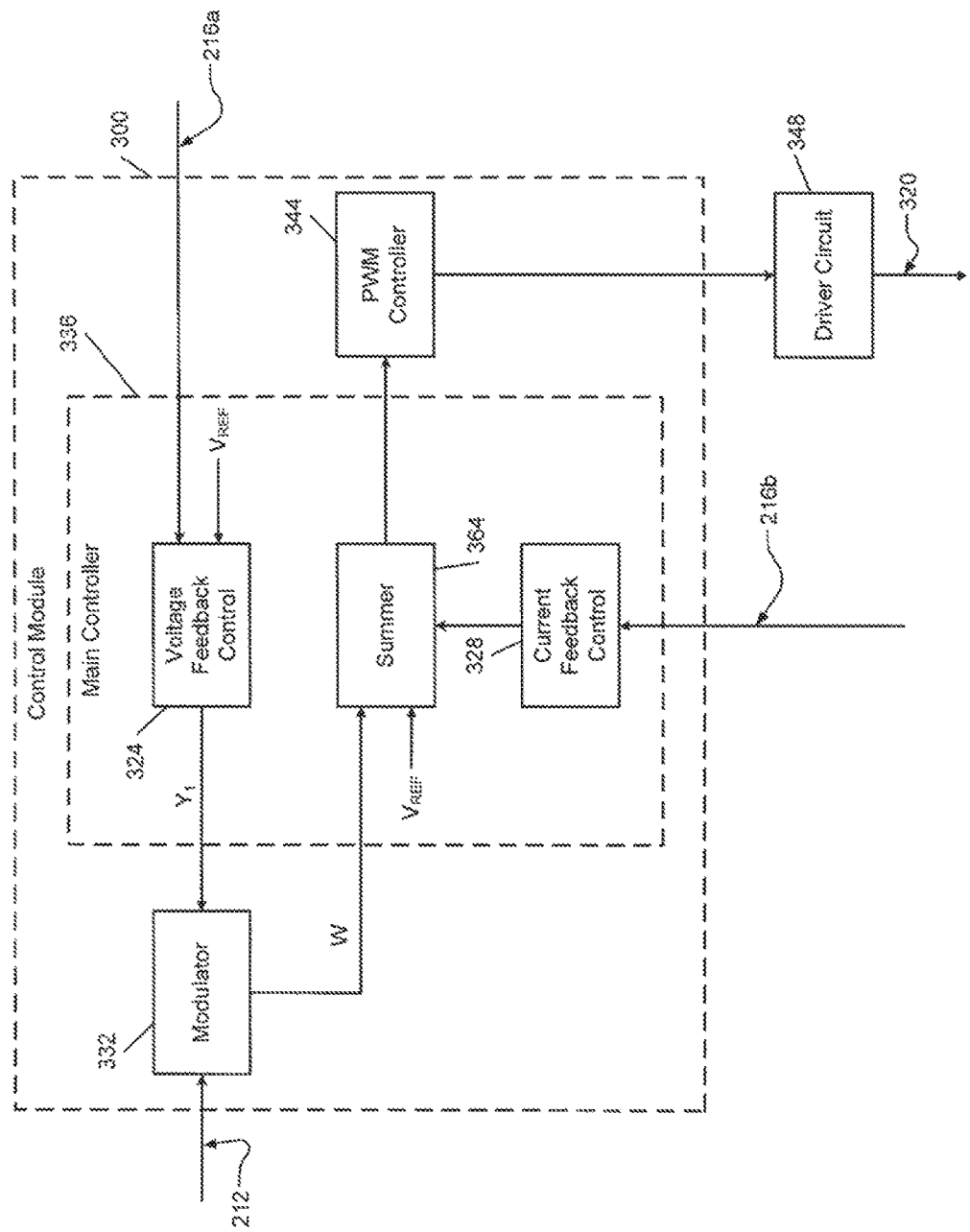
FIG. 3C is a block diagram that further illustrates another example implementation of the main controller of the single stage isolated power converter scheme that may be employed by the power tool.

FIG. 3C is a block diagram further illustrating another example implementation of the main controller 336 of the single stage isolated power converter 208. This block diagram is a higher level diagram of the example schematic described in detail in FIGS. 5A-E. In this example implementation, the control module 300 is comprised generally of the modulators 332, the main controller 336, and the PWM controller 344. Additionally, the main controller 336 is comprised generally of current feedback control 328, voltage feedback control 324, and a summer 364. The main controller 336 receives the voltage feedback signal 216a and the current feedback signal 216b. The voltage feedback control 324 produces signal $Y_1$ which represents the amplified error between the voltage feedback signal 216a and the setpoint voltage $V_{REF}$. The modulator 332 modulates the voltage feedback control output signal $Y_1$ with the AC line voltage 212 to produce signal W.

The current feedback control 328 of the control module 300 receives the sensed current 216b indicative of the current applied to the electric motor or load. In the example embodiment, the sensed current 216b is measured across a resistor electrically coupled to one of the motor switches. To isolate the isolated power converter 208 from the load 220, a secondary transformer T1 may be coupled between the sense resistor (as seen in FIGS. 5A-E) and the motor switch. The sensed current 216b is in turn fed into the summer 364 to account for any potential current variations which may exceed a current limit as set by the main controller 336. The summer 364 combines the control signal W with output from the current control 328. The summer 364 produces a PWM control signal that is fed to the PWM controller 344.

Figure 4A:
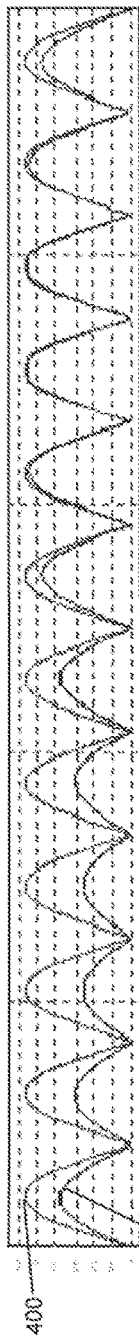
FIGS. 4A-4D are graphs depicting waveforms for an example embodiment of a single stage AC to DC isolated power converter.

FIGS. 4A-4D depict waveforms of the example embodiment of the single stage AC to DC isolated power converter. FIG. 4A shows the modulating feedforward signal 400 of the AC line voltage and the modulated feedback signal 404 sent to the PWM controller 344 to adjust the output voltage. The modulating feedforward signal depicted by 400 is shown in FIG. 3A as the feedforward signal 212 or the AC line voltage that is multiplied with the error signal Y1 in the modulator 332 to create the control signal W in the control module 300. The modulated feedback signal 404 is the switching control signal 320 sent from the control module 300 and used to control the switching arrangement 304. The modulated feedback signal 404 is the combined modulated voltage control feedback and the current control feedback.

Figure 4B:
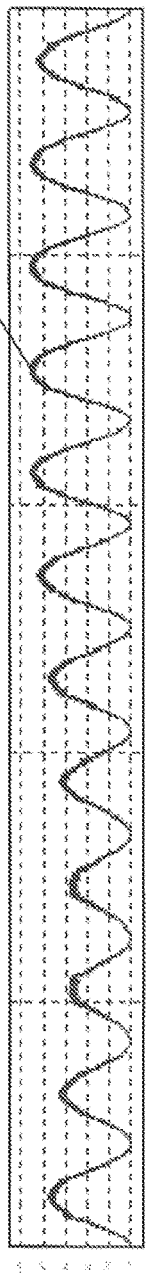
Figure 4C:
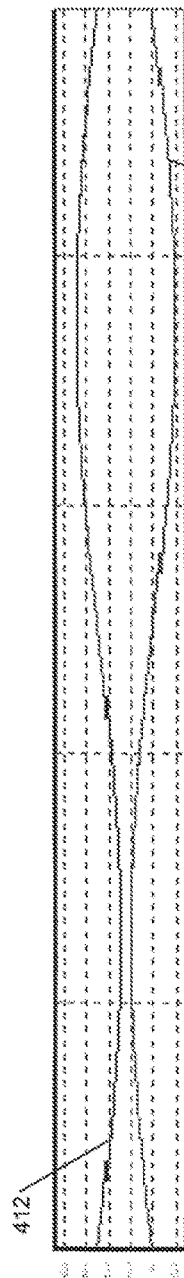

FIG. 4C shows the error signal Y1 412 and the voltage feedback signal ($V_{FB}$) 416. The error signal Y1 is produced in the control module 300 by the voltage feedback control 324 and sent to the modulator 332. The error signal Y1 is multiplied with the AC line voltage 212 shown as a waveform in FIG. 4A. The voltage feedback signal 216a depicted by 416 is the output voltage ($V_{OUT}$) signal fed back to modulate the output voltage sent to the load 220.

Figure 4D:
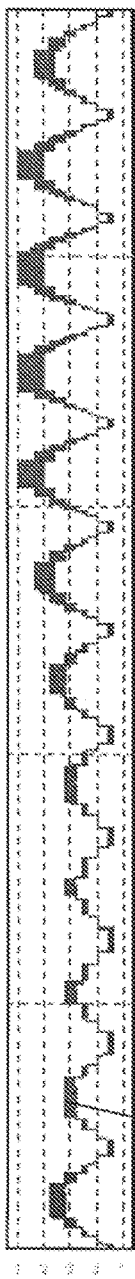
Figure 5A:
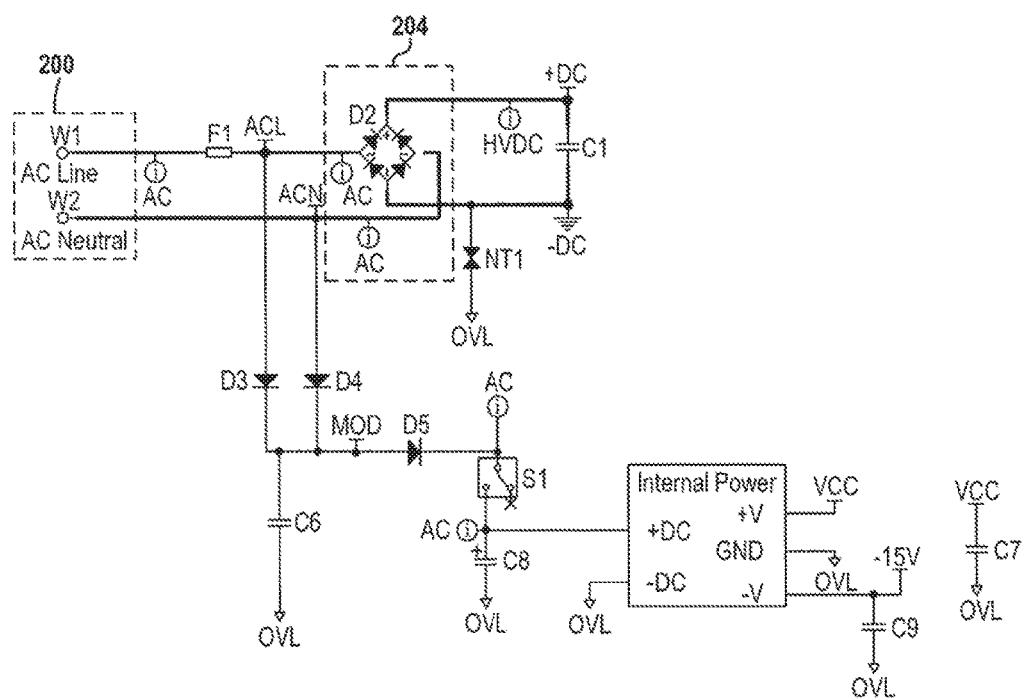
FIGS. 5A-E show a schematic implementation of the example embodiment of a single stage AC to DC power converter.
Figure 5B:
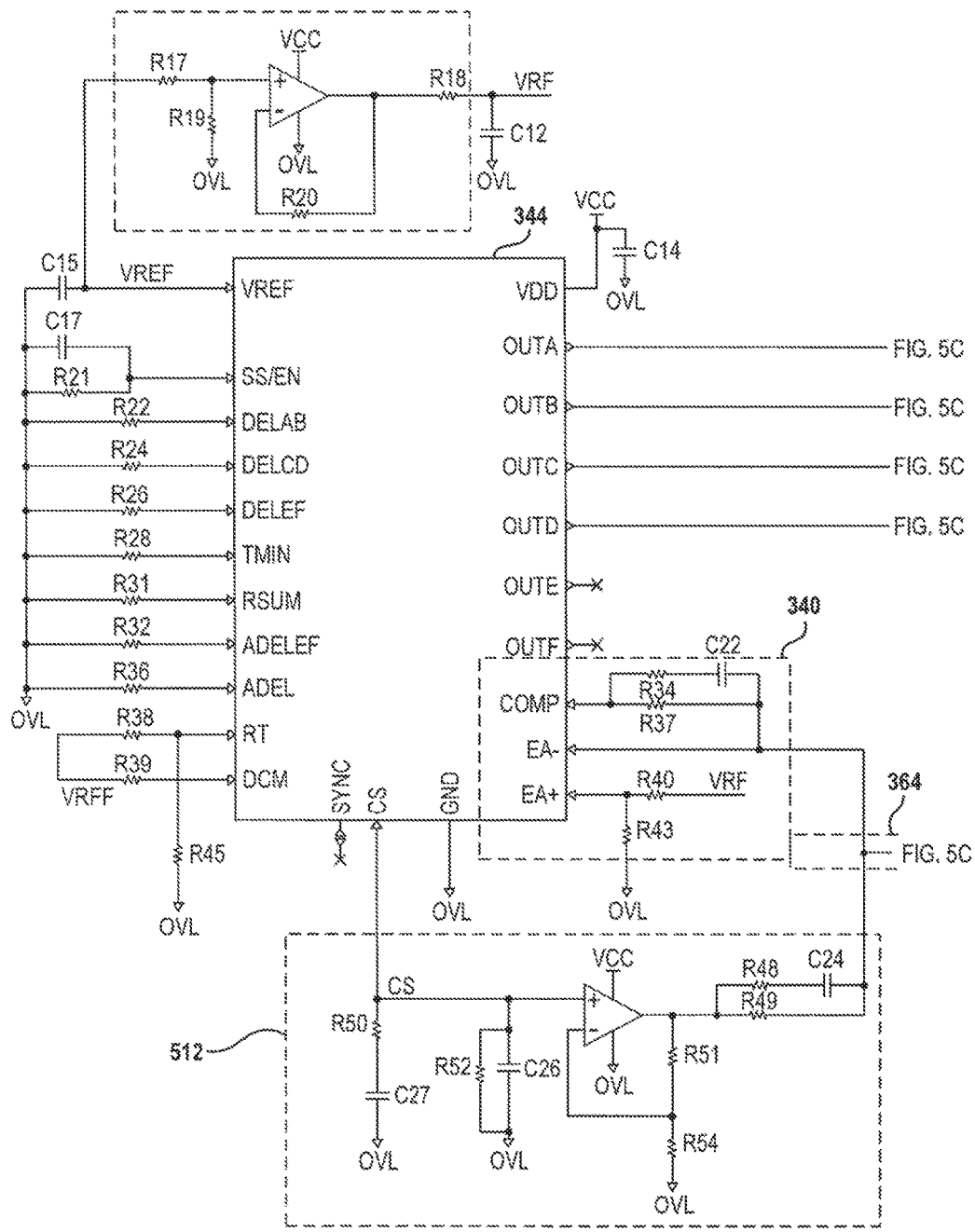
Figure 5C:
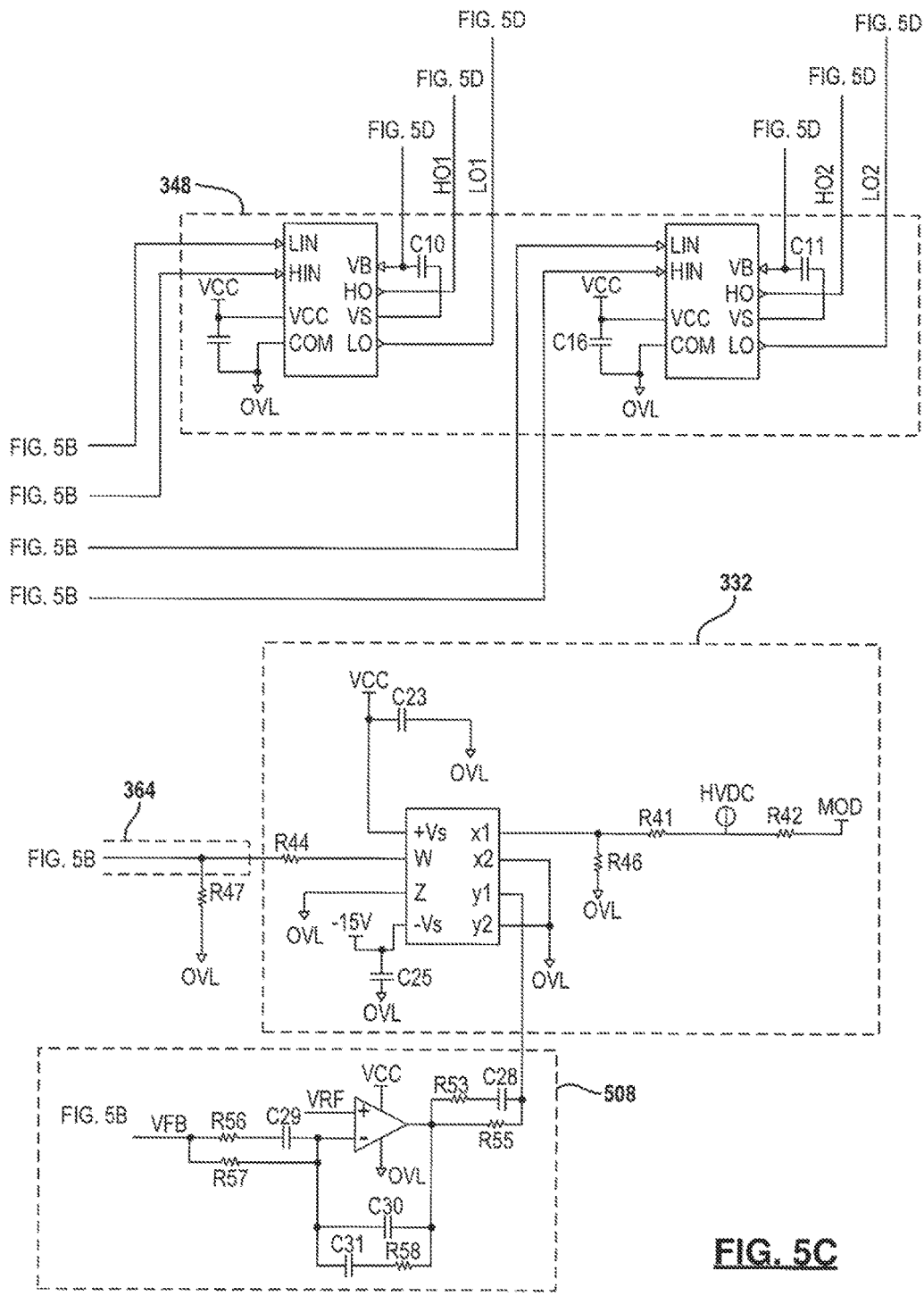
Figure 5D:
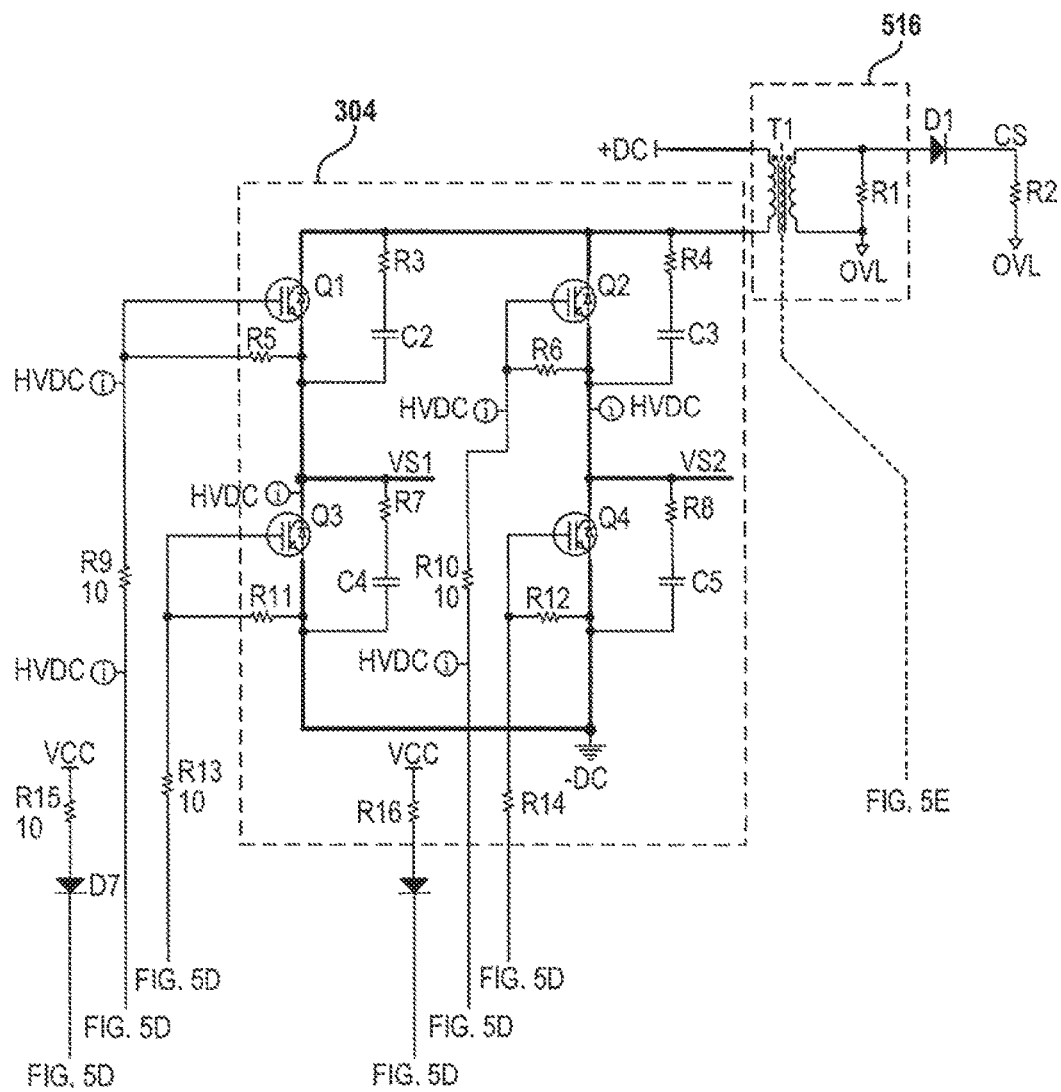
Figure 5E:
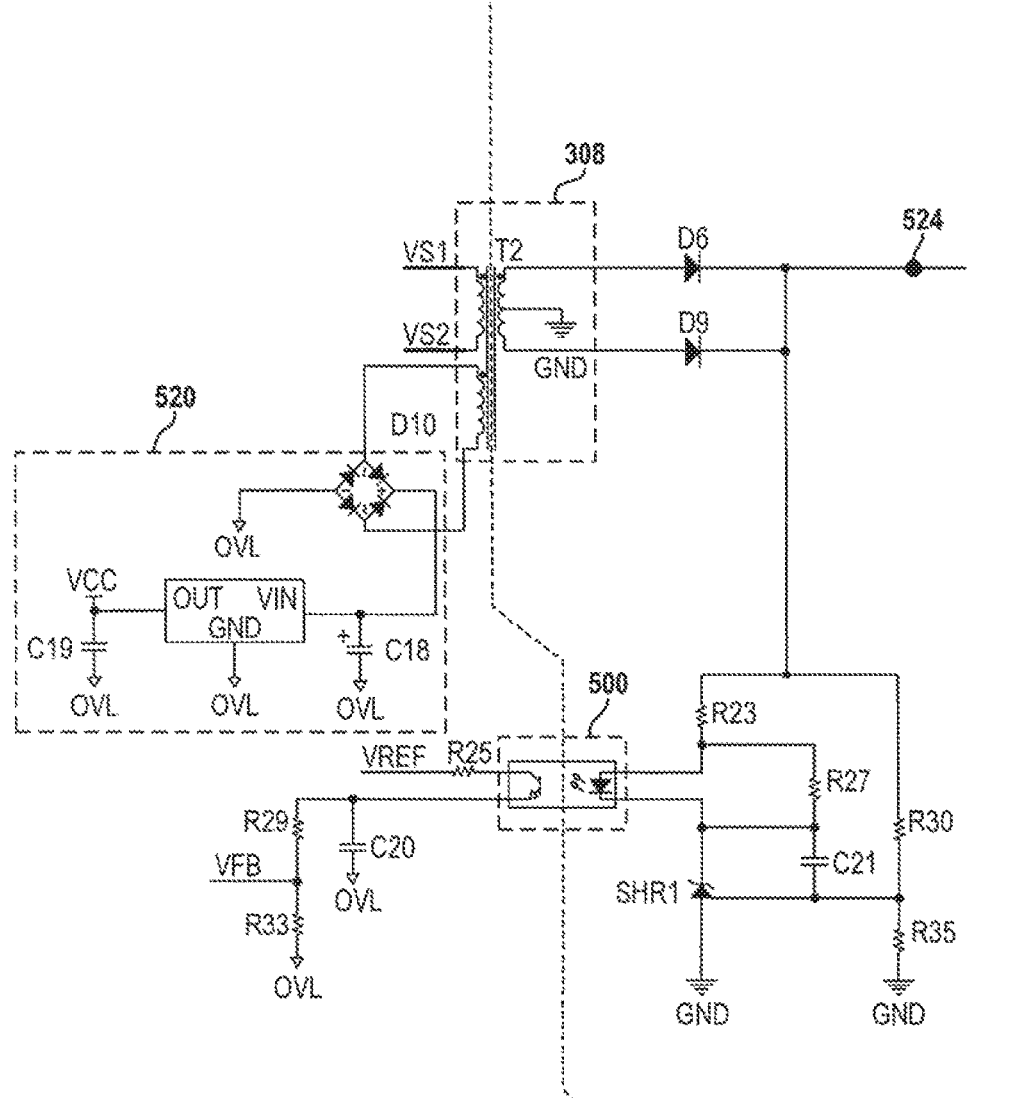

FIG. 4D shows the average of the duty cycle 420, which follows the modulated feedback signal 404 as this is the signal used by the PWM controller 344 to control the switching arrangement 304. FIG. 4B shows the output voltage (VOUT) 408 sent to the load 220.

FIGS. 5A-E are a schematic of a particular implementation of the proposed single stage AC to DC power converter. One or more DC bus capacitors C1 are electrically connected in parallel with the rectifier 204. In one aspect of this disclosure, the DC bus capacitor C1 is sized to ensure that the tool delivers output power that is comparable to the AC source power from the AC power supply or AC source 200.

In the example embodiment, the switching arrangement 304 is electrically connected to the DC bus capacitor C1 and may receive a pure DC signal or substantially pure DC signal from the DC bus capacitor C1. The switching arrangement 304 includes a plurality of motor switches that, when switched on, deliver the DC current to the load connected at an output voltage ($V_{OUT}$) node 524. Example motor switches include field effect transistors (FETs), insulated-gate bipolar transistors (IGBTs), etc. In the example embodiment, the switching arrangement 304 may be further defined as an H-bridge configuration. As shown, the H-bridge circuit includes two high-side and two low-side IGBTs. The gates of the IGBTs are driven by two driver circuits 348 to output power signal VS1 and VS2. These power signals connect to a three winding transformer that is the main transformer 308. Other switching arrangements are also contemplated by this disclosure.

The main transformer 308 isolates the output voltage ($V_{OUT}$) node 524 connected to the load or electric motor from the isolated power converter. The driver circuits 348 are interfaced with the motor switches of switching arrangement 304. The driver circuits 348 control the state of the motor switches, for example using pulse width modulated (PWM) control signals. In this embodiment, the driver circuits 348 are shown as being separate from the switching arrangement 304. In other embodiments, the driver circuits 348 and the switching arrangement 304 may be a single integrated circuit which may be commercially available from various manufactures. For example, the switching arrangement 304 and the driver circuits 348 may be a part of an integrated power module.

The PWM controller 344 manages the overall operation of the tool. For example, the PWM controller 344 controls switching operation of the motor switches in the switching arrangement 304. In one embodiment, the main controller is implemented by a microcontroller. The main controller may also refer to an electronic circuit, an application specific integrated circuit (ASIC), a processor (shared, dedicated, or group) and/or memory (shared dedicated, or group) that execute one or more software or firmware programs, a combinational logic circuit, and/or other suitable components that provide the described functionality.

In this embodiment, the PWM controller 344 receives power from an internal DC power supply 520. The internal DC power supply 520 is connected on the primary side of the main transformer 308 and operates to power the driver circuits 348. In an example embodiment, the internal DC power supply 520 includes a buck converter and/or a linear regulator to reduce the power voltage, for example, to 15V for powering the driver circuits 348 and to 3.2V for powering the PWM controller 344.

Voltage control, as shown in FIG. 3A as 324, within the isolated power converter is comprised generally of an optoisolator 500, a voltage buffer 504, and an integrating operational amplifier 508. The optoisolator 500 is a phototransistor receiving the output voltage ($V_{OUT}$). The output voltage is controlled by a Zener diode SHR1 and diodes D6 and D9 to maintain the voltage at a relatively constant value. The optoisolator 500 outputs a feedback voltage ($V_{FB}$), which is a proportional linear representation of the error between the output voltage ($V_{OUT}$) and the reference or setpoint voltage ($V_{REF}$). The voltage buffer 504 is an operational amplifier that acts as an isolation buffer, inputting the reference or setpoint voltage ($V_{REF}$), generated by the PWM controller 344, and producing a stable, almost identical reference or setpoint voltage ($V_{RF}$) for use in the voltage modulation scheme.

The integrating operational amplifier 508 outputs a voltage proportional to the magnitude and duration that the feedback voltage ($V_{FB}$) differs from the isolation buffer setpoint voltage ($V_{RF}$). This output is Y1, which, as stated, is a signal of error between the output voltage ($V_{OUT}$) and the setpoint voltage ($V_{REF}$). The modulator 332 is then fed the voltage error signal Y1 and modulates the error signal with the AC line voltage, shown in the circuit as connecting at MOD. The multiplier corrects the power factor by conducting voltage modulation. Voltage modulation is accomplished by forcing the voltage error signal Y1 to follow the AC line voltage. The summer 364 is a resistive adder, combining the voltage modulated control signal W with the output of a current buffer 512.

The current control 328 is comprised generally of the current buffer 512 and a current sense transformer 516 or T1. In an example embodiment, the current control 328 employs DC to DC flyback converter topology to ensure the rectified current does not exceed the current limit as prescribed by the PWM controller 344. The current control 328 uses the current sense transformer 516 or T1 to make sure a cycle-by-cycle current limit, which is set by the PWM controller 344, is not exceeded. The current sense transformer 516 or T1 provides galvanic isolation between higher and lower DC voltage. The primary side of the current sense transformer T1 is connected to the rectified AC power supply 200. The isolated current on the secondary side of T1 is indicative of a real time current. A current sensing resistor R2 or shunt regulator is used to convert the real time current to a proportional voltage; this proportional voltage is the input of the current sense pin 15 on the PWM controller 344.

When the current limit has not been exceeded, the voltage control 324 maintains the output voltage at or below a setpoint voltage employing the previously discussed voltage modulation scheme. When the current limit has been exceeded, proportional current control 328 is added to the voltage control 324 modulation scheme through the summer 364. This alters the operation of the switching arrangement 304 to ensure the output voltage does not produce a current that exceeds the current limit.

Figure 6A:
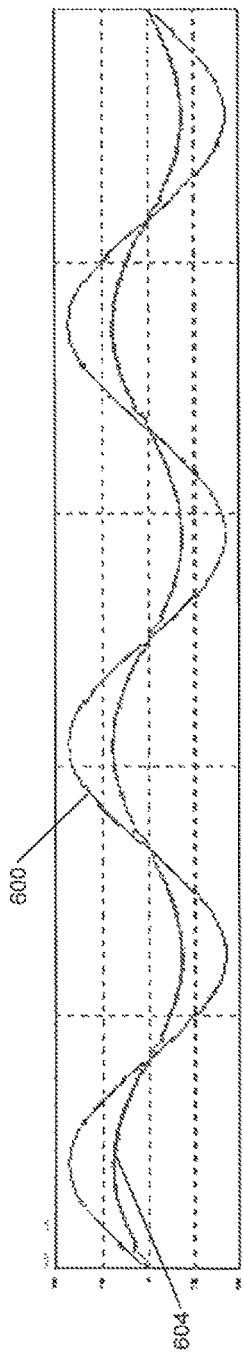
FIGS. 6A-6C are graphs depicting waveforms for a traditional two stage AC to DC power converter with full power factor correction, cycle-by-cycle current modulation, and a step down isolated converter.
Figure 6B:
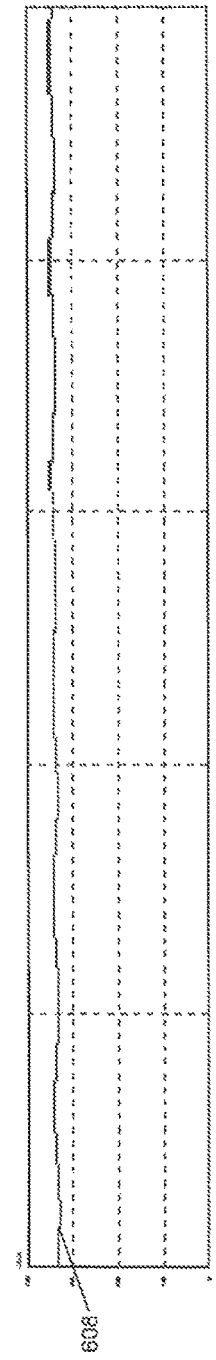
Figure 6C:
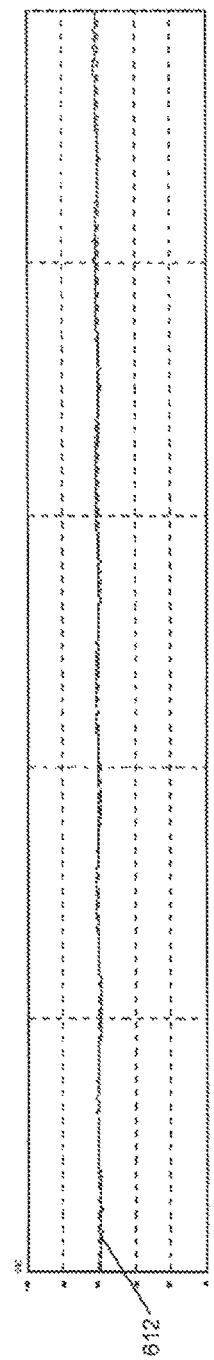

FIGS. 6A-6C depict waveforms for a traditional two stage AC to DC power converter with full power factor correction, cycle-by-cycle current modulation, and a step down isolated converter. FIG. 6A shows the AC voltage 600 and AC current 604 at the AC power supply 200. In a traditional two stage AC to DC power converter with full power factor correction, the AC voltage 600 is used as a model waveform to produce AC current 604 with the same phase and frequency.

FIG. 6B shows the DC bus voltage 608 after the rectifier 204; whereas, FIG. 6C shows the output voltage ($V_{OUT}$) 612, which is used to drive the load 220.

Figure 7A:
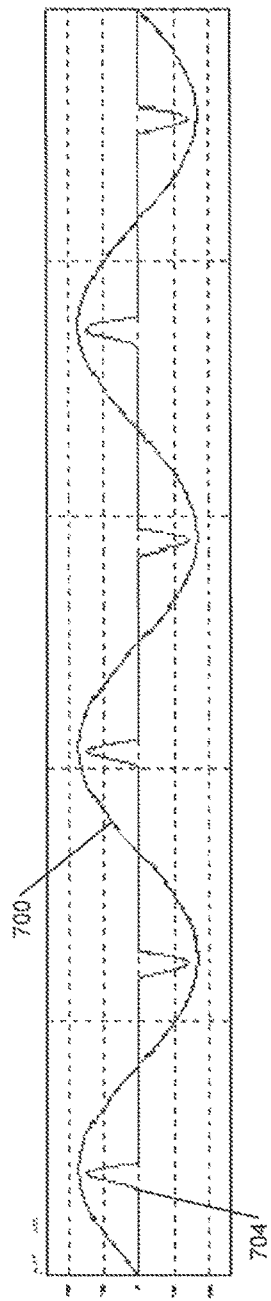
FIGS. 7A-7C are graphs depicting waveforms for the proposed single stage approach for an AC to DC isolated converter without voltage modulation.
Figure 7B:
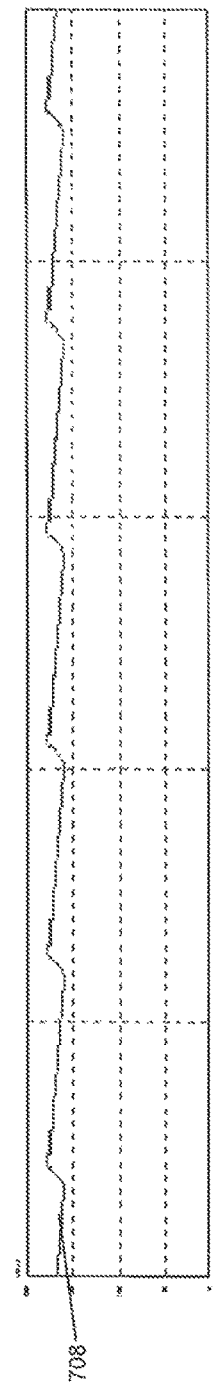
Figure 7C:
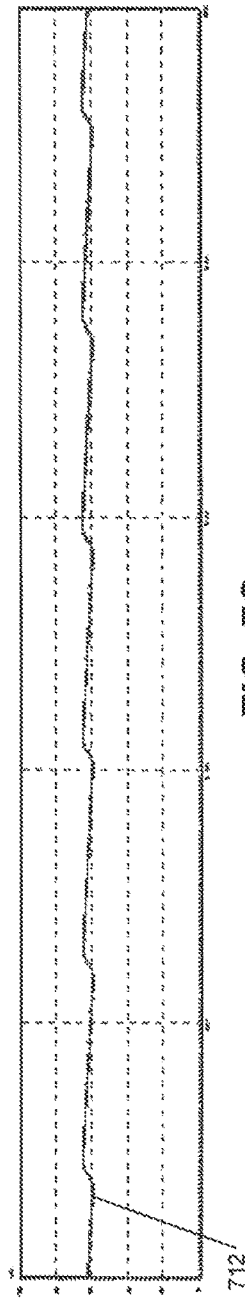

FIGS. 7A-7C depicting waveforms for the proposed single stage approach of an AC to DC isolated converter without voltage modulation. FIG. 7A shows the AC voltage 700 and AC current 704 at the AC power supply 200. The shape of the AC current 704 determines harmonics and power factor; here, the narrow current has the highest harmonics.

FIG. 7B shows the DC bus voltage 708 after the rectifier 204; whereas, FIG. 7C shows the output voltage ($V_{OUT}$) 712, which is used to drive the load 220. This approach exclusively uses the AC current 704 to modulate any voltage feedback signal 216a from the output voltage ($V_{OUT}$) 712. Modulating with the AC current and not using power factor correction to modify the output voltage results in higher harmonics and a lower power factor. In the present implementation, the harmonics and power factor are fixed by using the voltage modulation technique described above.

Figure 8A:
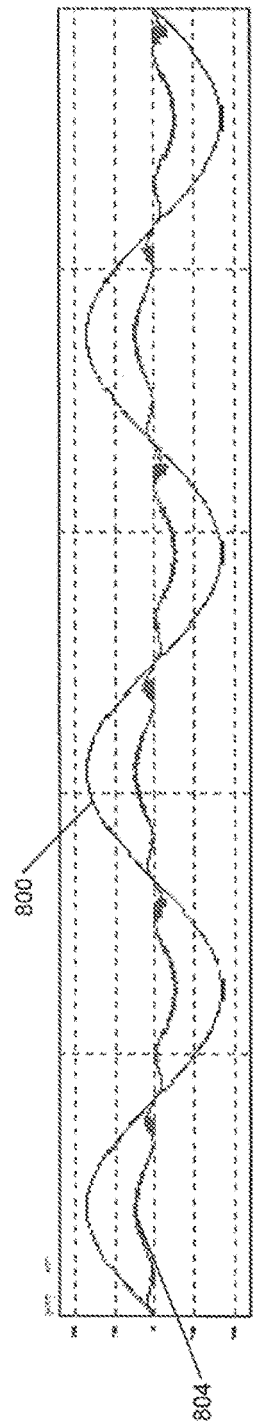
FIGS. 8A-8C are graphs depicting waveforms for an example embodiment of a single stage AC to DC isolated power converter employing the proposed voltage modulation technique.
Figure 8B:
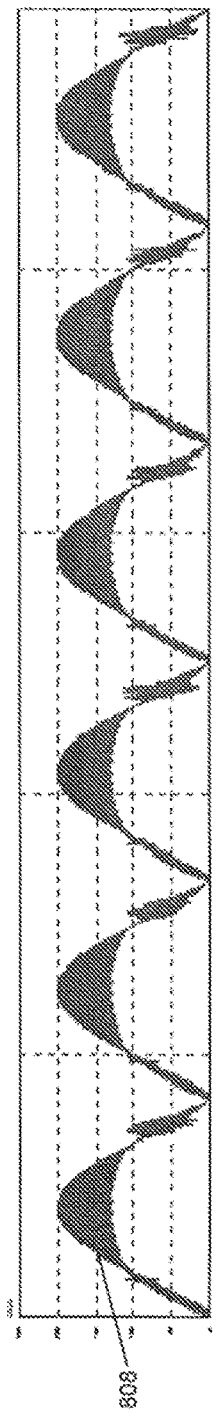
Figure 8C:
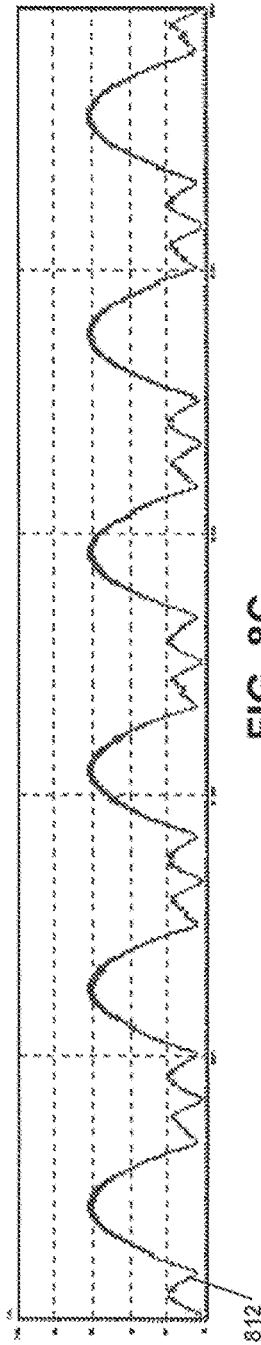

Lastly, FIGS. 8A-8C depicting waveforms for the example embodiment of the proposed single stage AC to DC isolated power converter with voltage modulation technique. This graph shows the AC voltage 800 and AC current 804 at the AC power supply 200. The AC current 804 has some ripple but very low frequency, showing reduced harmonics as compared to the high harmonics demonstrated by waveform 704 in FIG. 7A.

FIG. 8B shows the DC bus voltage 808 after the rectifier 204. The DC bus voltage 808 follows the AC voltage input 800 because of the very low DC bus capacitance C1.

FIG. 8C shows the output voltage ($V_{OUT}$) 812, which is used to drive the load 220. These graphs depict a higher power factor resulting from the use of the modulator 332 for power factor correction.

Figure 9:
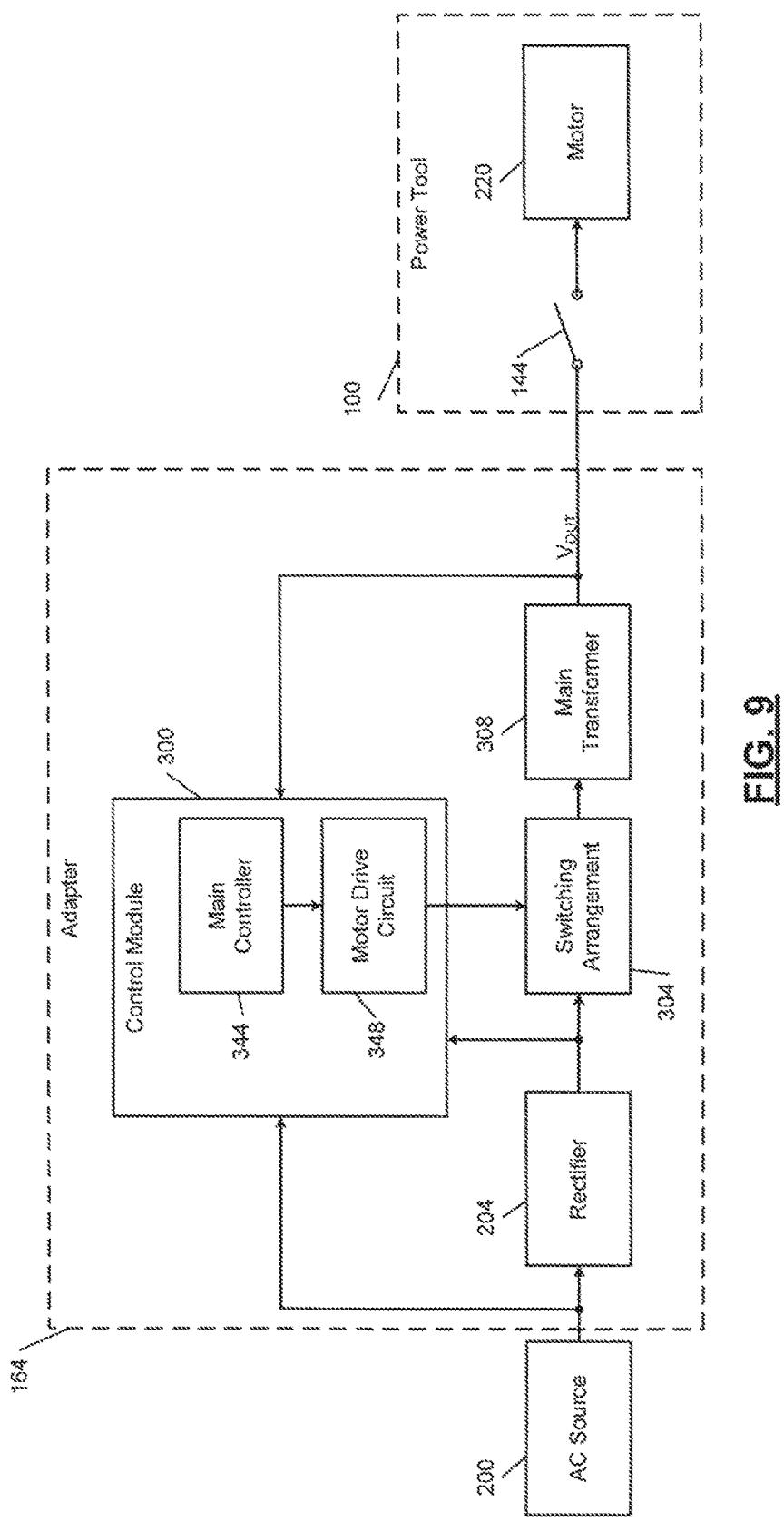
FIG. 9 is a block diagram of an example embodiment of a single stage isolated power converter scheme within an adapter that may be employed by the power tool.

FIG. 9 is a block diagram of an example embodiment of a single stage isolated power converter scheme integrated into an adapter that may be employed by the power tool. For example, the power tool 100 shown in FIG. 1 includes the housing 104 that detachably couples to an adapter 164, which provides DC power to the electric motor or load 220 that is within the housing 104 of the power tool 100.

In the example embodiment, the adapter 164 is comprised generally of the rectifier 204, the control module 300, the switching arrangement 304, and the main transformer 308. The adapter 164 is configured to connect to the AC source 200 (e.g., via a power cord), which may be an AC power socket, to receive the incoming AC voltage signal. The rectifier 204, control module 300, switching arrangement 304, and main transformer operate as described previously in the example embodiment of FIG. 3A to convert the AC signal to a DC signal and provide voltage to the load 220.

Figure 10:
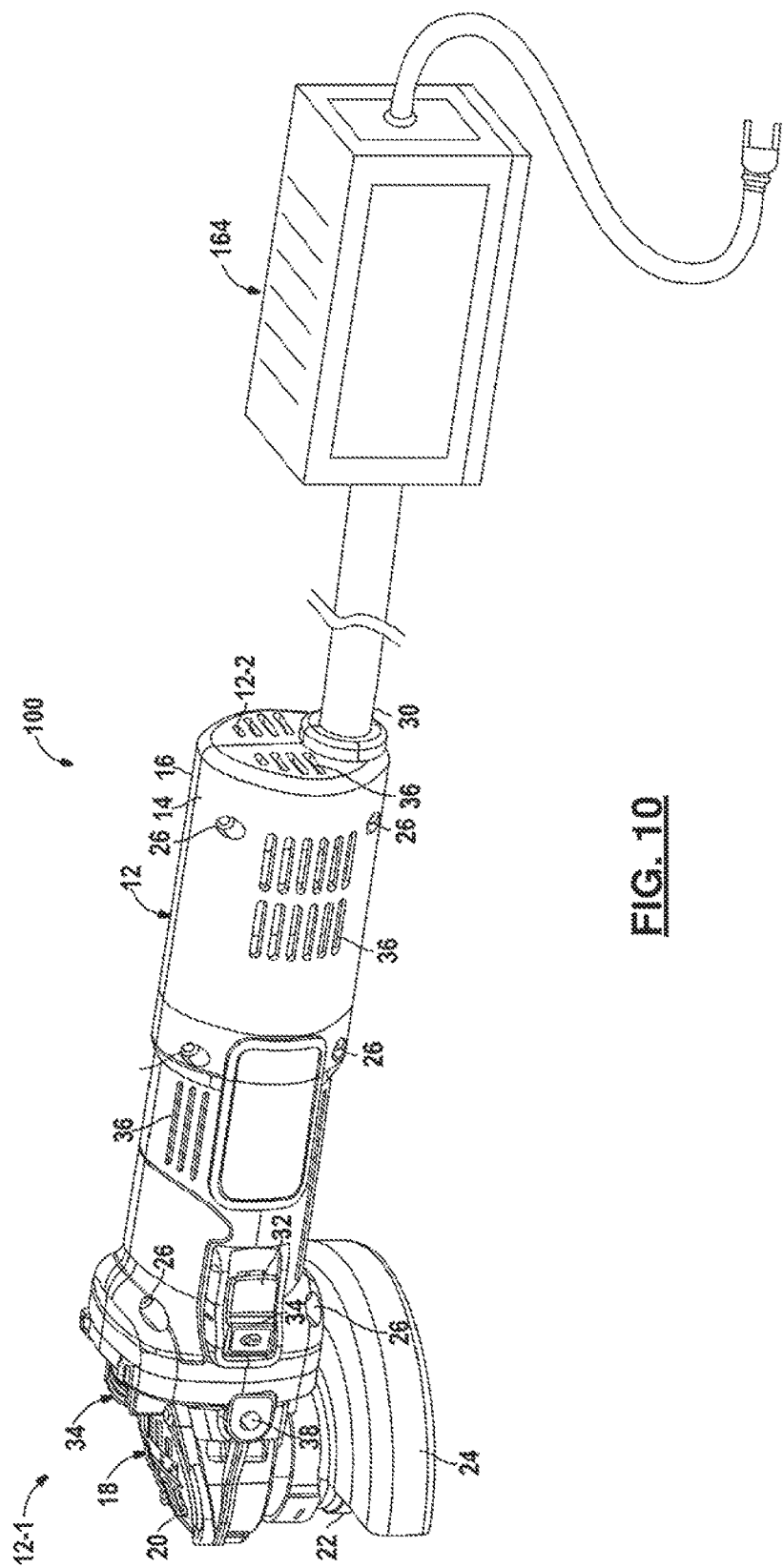
FIG. 10 is a diagram of a power tool with an adapter having the single stage isolated power converter integrated therein.

The power on/off switch 144 is a component of the power tool 100 for the operator to toggle between an on and off state and connect the DC converted voltage to the electric motor or load 220. An example of the adapter 164 coupled to the power tool 100 is also shown in FIG. 10.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A power tool, comprising:
a brushless electric motor;
a rectifier circuit configured to receive an incoming alternating current (AC) voltage signal and operable to convert the incoming AC voltage signal to a rectified voltage signal having direct current;
a switching arrangement having a plurality of electronic switches configured as an H-bridge circuit and interposed between the electric motor and the rectifier;
a transformer electrically coupled between the switching arrangement and the electric motor to provide a load voltage to the electric motor;
a control module configured to receive a first feedback signal indicative of voltage applied to the electric motor and a second feedback signal indicative of current applied to the electric motor, and generate a control signal representing a combination of amounts by which the first feedback signal and the second feedback signal respectively deviate from a desired voltage amount and a desired current amount, where the control signal is used to maintain a target setpoint load voltage applied to the electric motor;
a modulator configured to receive a feed-forward AC voltage signal corresponding to the incoming AC voltage signal and the control signal, and to modulate the control signal with the incoming AC voltage signal to produce pulse-width modulated (PWM) signals, the PWM signals having duty cycles set based on the feed-forward AC voltage to form an AC current waveform substantially proportional and in phase with the AC voltage for power factor correction of AC current, the duty cycles being also proportional to the control signal so as to maintain the target setpoint load voltage; and a drive circuit interfaced with the electronic switches and configured to control switching operation of the electronic switches to modulate the rectified voltage signal in accordance with the PWM signals and output modulated voltage to the transformer.

2. The power tool of claim 1 wherein the control module is further configured to (i) generate a correction signal based on an error signal, wherein the error signal is proportional to a difference between the first feedback signal and the target setpoint voltage; and (ii) multiply the incoming AC voltage signal with the correction signal to generate the control signal.

3. The power tool of claim 1 wherein the control module is further configured to generate a current control signal in response to the current applied to the electric motor exceeding a current limit.

4. The power tool of claim 1 further comprises a second rectifier circuit electrically coupled between the transformer and the electric motor.

5. The power tool of claim 1 further comprising a bus capacitor disposed in parallel to rectifier circuit.

6. The power tool of claim 1 includes a housing that detachably couples to an adapter, wherein the electric motor resides in the housing and the adapter houses the rectifier circuit, the switching arrangement, the transformer, the drive circuit and the control module.

7. The power tool of claim 6 wherein the adapter includes a power cord connectable to an AC power socket to receive the incoming AC voltage signal.

8. An apparatus adaptable to be electrically connected between an alternating current (AC) power supply and a load, comprising:
a rectifier circuit configured to receive an incoming alternating current (AC) voltage signal from the AC power supply and operable to convert the incoming AC voltage signal to a rectified voltage signal having direct current;
a switching arrangement having a plurality of electronic switches configured as an H-bridge circuit and interposed between the load and the rectifier;
a transformer electrically coupled between the switching arrangement and the load to provide a load voltage to the load;
a control module configured to receive a first feedback signal indicative of voltage applied to the load and a second feedback signal indicative of current applied to the load, and generate a control signal representing a combination of amounts by which the first feedback signal and the second feedback signal respectively deviate from a desired voltage amount and a desired current amount, where the control signal is used to maintain a target setpoint load voltage applied to the load;
a modulator configured to receive a feed-forward AC voltage signal corresponding to the incoming AC voltage signal and the control signal, and to modulate the control signal with the incoming AC voltage signal to produce pulse-width modulated (PWM) signals, the PWM signals having duty cycles set based on the feed-forward AC voltage to form an AC current waveform substantially proportional and in phase with the AC voltage for power factor correction of AC current, the duty cycles being also proportional to the control signal so as to maintain the target setpoint load voltage; and
a drive circuit interfaced with the electronic switches and configured to control switching operation of the electronic switches to modulate the rectified voltage signal in accordance with the PWM signals and output modulated voltage to the transformer.

9. The apparatus of claim 8 wherein the control module is further configured to generate a current control signal in response to the current applied to the electric motor exceeding a current limit.

10. An adaptor for powering a power tool having an electric motor, comprising:
a housing;
a rectifier circuit configured to receive an incoming alternating current (AC) voltage signal and operable to convert the incoming AC voltage signal to a rectified voltage signal having direct current;
a switching arrangement having a plurality of electronic switches configured as an H-bridge circuit electrically interconnecting the input signal to the electric motor;
a transformer electrically coupled between the switching arrangement and the electric motor;
a control module configured to receive a first feedback signal indicative of voltage applied to the electric motor and a second feedback signal indicative of current applied to the electric motor, and generate a control signal representing a combination of amounts by which the first feedback signal and the second feedback signal respectively deviate from a desired voltage amount and a desired current amount, where the control signal is used to maintain a target setpoint voltage applied to the electric motor;
a modulator configured to receive a feed-forward AC voltage signal corresponding to the incoming AC voltage signal and the control signal, and to modulate the control signal with the incoming AC voltage signal to produce pulse-width modulated (PWM) signals, the PWM signals having duty cycles set based on the feed-forward AC voltage to form an AC current waveform substantially proportional and in phase with the AC voltage for power factor correction of AC current, the duty cycles being also proportional to the control signal so as to maintain the target setpoint load voltage; and
a drive circuit interfaced with the electronic switches and configured to control switching operation of the electronic switches to modulate the rectified voltage signal in accordance with the PWM signals and output modulated voltage to the transformer,
wherein the rectifier, the switching arrangement, the transformer, the motor drive circuit and the control module residing in the housing, where the housing detachably couple to a mounting portion of the power tool and electrically interfaces the transformer to the electric motor in the power tool.

11. The adapter of claim 10 further comprises a power cord connectable to an AC power socket to receive the incoming AC voltage signal.

12. The adapter of claim 10 wherein the control module is further configured to combine the second feedback signal with the first feedback signal.

13. The adapter of claim 12 wherein the control module is further configured to generate a current control signal in response to the current applied to the electric motor exceeding a current limit.

14. The power tool of claim 1, further comprising an AC voltage sensor configured to produce the feed-forward voltage signal based on the incoming AC voltage signal.

15. The apparatus of claim 8, further comprising an AC voltage sensor configured to produce the feed-forward voltage signal based on the incoming AC voltage signal.

16. The adapter of claim 10, further comprising an AC voltage sensor configured to produce the feed-forward voltage signal based on the incoming AC voltage signal.

* * * * *